United States Patent [19]
Lambert et al.

[11] Patent Number: 5,525,873
[45] Date of Patent: Jun. 11, 1996

[54] PICTURE DISPLAY DEVICE COMPRISING A FLAT-PANEL TYPE DISPLAY UNIT

[75] Inventors: Nicolaas Lambert; Henricus J. Ligthart; Siebe T. De Zwart; Petrus H. F. Trompenaars; Gerardus G. P. Van Gorkom, all of Eindhoven, Netherlands

[73] Assignee: U.S. Philips Corporation, New York, N.Y.

[21] Appl. No.: 373,917

[22] Filed: Jan. 17, 1995

Related U.S. Application Data

[63] Continuation of Ser. No. 287,052, Aug. 8, 1994, which is a continuation of Ser. No. 990,780, Dec. 9, 1992, abandoned, which is a continuation-in-part of Ser. No. 830,951, Feb. 6, 1992, Pat. No. 5,313,136, which is a continuation of Ser. No. 528,677, May 24, 1990, abandoned, and Ser. No. 53,980, Apr. 26, 1993, Pat. No. 5,347,199, which is a continuation of Ser. No. 954,949, Sep. 30, 1992, abandoned, which is a continuation of Ser. No. 637,039, Jan. 3, 1991, abandoned, which is a continuation-in-part of Ser. No. 830,951, Feb. 6, 1992.

[30] Foreign Application Priority Data

Jan. 3, 1992 [EP] European Pat. Off. .............. 92200017

[51] Int. Cl.⁶ ........................... H01J 29/70; H01J 29/72
[52] U.S. Cl. ................................. 315/366; 313/422
[58] Field of Search ............................ 315/366; 313/422

[56] References Cited

U.S. PATENT DOCUMENTS

| | | | |
|---|---|---|---|
| 4,158,157 | 6/1979 | Schwartz | 315/366 |
| 4,626,899 | 12/1986 | Tomii et al. | 358/65 |
| 4,694,225 | 9/1987 | Tomii et al. | 315/366 |
| 4,703,231 | 10/1987 | Tomii et al. | 315/366 |
| 4,736,139 | 4/1988 | Tomii et al. | 315/366 |
| 4,965,487 | 10/1990 | Freeman | 313/422 |
| 4,980,613 | 12/1990 | Miyama et al. | 315/366 |
| 5,061,880 | 10/1991 | Hashiguchi et al. | 315/366 |
| 5,220,240 | 6/1993 | Ohoshi et al. | 313/422 |

FOREIGN PATENT DOCUMENTS

| | | | |
|---|---|---|---|
| 0328079 | 8/1989 | European Pat. Off. | H01J 31/12 |
| 0436997 | 12/1990 | European Pat. Off. | |
| 0400750 | 12/1990 | European Pat. Off. | H01J 31/12 |

*Primary Examiner*—Theodore M. Blum
*Attorney, Agent, or Firm*—Robert J. Kraus

[57] ABSTRACT

Picture display device includes a display unit having a vacuum envelope which is provided with a transparent face plate with a luminescent screen and a rear plate. The display unit includes a plurality of juxtaposed sources for emitting electrons, a plurality of electron transport ducts cooperating with the sources and extending substantially parallel to the face plate for transporting the electrons in the form of electron currents, and an active selection structure for withdrawing each electron current at predetermined locations from its transport duct and for directing the current towards desired pixels of the luminescent screen.

The picture display device further includes a video signal processing circuit for receiving an incoming video signal having a given line number, for processing the video signal to a video signal which is suitable for the luminescent screen, and for applying the processed video signal to a video drive circuit coupled to the sources.

17 Claims, 10 Drawing Sheets

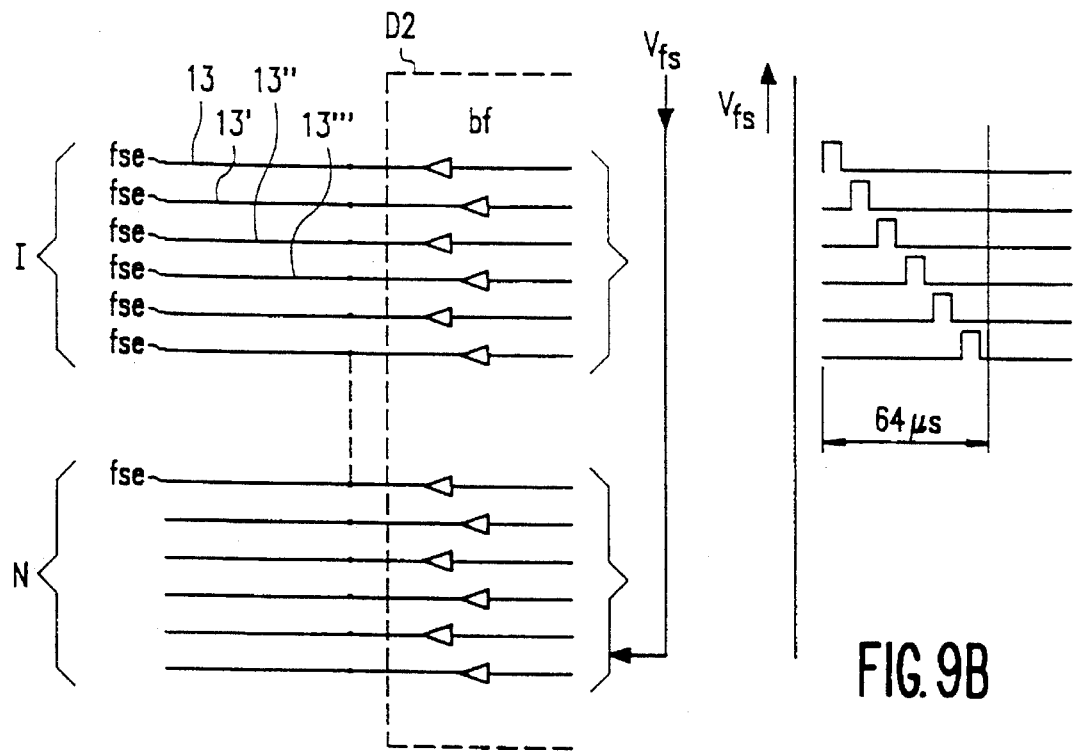
FIG. 9A
FIG. 9B
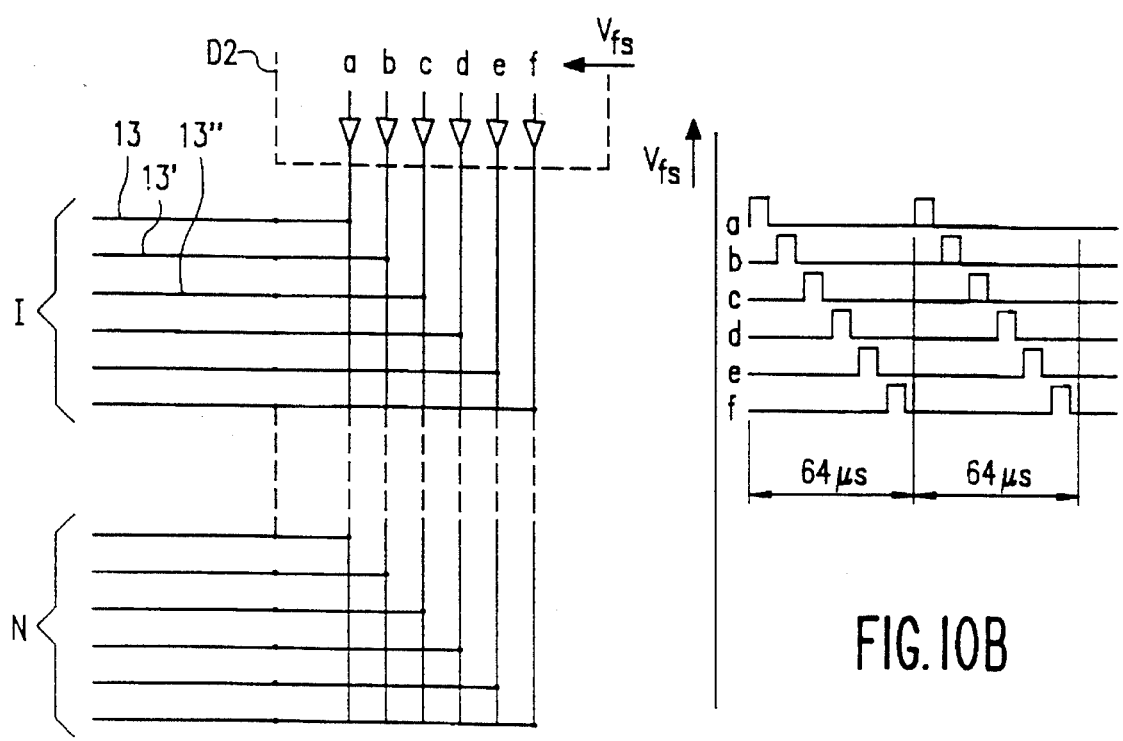
FIG. 10A
FIG. 10B

PICTURE DISPLAY DEVICE COMPRISING A FLAT-PANEL TYPE DISPLAY UNIT

CROSS-REFERENCE TO RELATED APPLICATIONS

This is a continuation application Ser. No. 08/287,052, filed on 8 Aug. 1994, which is a continuation of prior application Ser. No. 07/990,780, filed on 9 Dec. 1992, now abandoned, which is a continuation-in-part of: allowed U.S. patent application Ser. No. 07/830,951 filed on 6 Feb. 1992, now U.S. Pat. No. 5,313,136, which is a continuation of U.S. patent application Ser. No. 07/528,677 filed on 24 May 1990, now abandoned; and of U.S. patent application Ser. No. 08/053,980 filed on 26 Apr. 1993, now U.S. Pat. No. 5,347,199, which is a continuation of U.S. patent application Ser. No. 07/954,949 filed on 30 Sep. 1992, now abandoned, which is a continuation of U.S. patent application Ser. No. 07/637,039 filed on 3 Jan. 1991, now abandoned, which is a continuation-in-part of U.S. patent application Ser. No. 07/830,951 filed on 6 Feb. 1992.

BACKGROUND OF THE INVENTION

The invention relates to a picture display device comprising a display unit having a vacuum envelope which is provided with a transparent face plate with a luminescent screen and a rear plate, said display unit comprising a plurality of juxtaposed sources for emitting electrons, a plurality of electron transport ducts cooperating with the sources and extending substantially parallel to the face plate for transporting the electrons in the form of electron currents, and an active selection structure for withdrawing each electron current at predetermined locations from its transport duct and for directing said current towards desired pixels of the luminescent screen.

The display unit mentioned above is of the flat-panel type, as disclosed in European Patent Applications EP-A-400 750 and EP-A-436 997. Display units of the flat-panel type are constructions having a transparent face plate and, arranged at a small distance therefrom, a rear plate, which plates are interconnected by means of partitions and in which the inner side of the face plate is provided with pixels in the form of a phosphor pattern, one side of which is provided with an electrically conductive coating (the combination also being referred to as a luminescent screen). If (video information-controlled) electrons impinge upon the luminescent screen, a visual image is formed which is visible via the front side of the face plate. The face plate may be flat or, if desired, curved (for example, spherical or cylindrical).

The types of display unit described in European Patent Applications EP-A-400 750 and EP-A-436 997 comprises a plurality of juxtaposed sources for emitting electrons, local electron transport ducts cooperating with the sources and each having walls of high-ohmic, electrically substantially insulating material having a secondary emission coefficient suitable for transporting emitted electrons in the form of electron currents and colour selection means comprising selectively energizable electrodes (selection electrodes) for withdrawing each electron current from its transport duct at predetermined extraction locations facing the luminescent screen, means being further provided for directing extracted electrons towards pixels of the luminescent screen for producing a picture composed of pixels.

The operation of the known display unit is based on the recognition that electron transport is possible when electrons impinge on an inner wall of an elongate evacuated cavity (referred to as "a compartment") defined by walls of a high-ohmic, electrically substantially insulating material (for example, glass or synthetic material), if an electric field of sufficient power is generated in the longitudinal direction of the "compartment" (by applying an electric potential difference across the ends of the "compartment"). The impinging electrons then generate secondary electrons by wall interaction, which electrons are attracted to a further wall section and in their turn generate secondary electrons again by wall interaction. The circumstances (field strength E, electrical resistance of the wall, secondary emission coefficient $\delta$ of the walls) may be chosen to be such that a substantially constant vacuum current will flow in the "compartment".

Starting from the above-mentioned principle, a flat-panel picture display unit can be realised by providing each one of a plurality of juxtaposed "compartments", which constitute transport ducts, with a column of extraction apertures at a side which is to face a display screen. It will then be practical to arrange the extraction apertures of adjacent transport ducts along parallel lines extending transversely to the transport ducts. By adding selection electrodes arranged in rows to the arrangement of apertures, which selection electrodes are energizable by means of a first (positive) electric voltage (pulse) for withdrawing electron currents from the "compartments" via the apertures of a row, or which are energizable by means of a second (lower) electric voltage if no electrons are to be locally withdrawn from the "compartments", an addressing means is provided with which electrons withdrawn from the "compartments" can be directed towards the screen for producing an image composed of pixels by activating the pixels.

SUMMARY OF THE INVENTION

It is an object of the invention to provide a picture display device which comprises a display unit as described hereinbefore, and means for controlling such a display unit in a suitable and simple manner. To this end a picture display device according to the invention is characterized in that, the picture display device comprises a video signal processing circuit for receiving an incoming video signal having a given line number, for processing the video signal to a video signal which is suitable for the luminescent screen and for applying the processed video signal to a video drive circuit coupled to the sources, and in that the video drive circuit is adapted to sequentially write the video signal received from the video signal processing circuit and to apply, in parallel, video information of a line to be displayed to drive electrodes of the juxtaposed sources, in that the picture display device comprises at least one clock generator for generating a write and a read clock signal and for applying the clock signals to the control section and in that the picture display device comprises a selection driver which is adapted to generate selection voltages under the control of the clock generator for withdrawing electron currents from a plurality of transport ducts at locations determined with reference to the selection voltages.

By controlling the display unit by means of this video drive circuit, it is possible to display a picture on the display unit, for example, a television signal received at an input of the picture display device.

A further object of the invention is to provide a picture display device in which a conversion of an incoming serial video signal to a parallel video signal to be applied to the display unit is realised in a simple manner.

An embodiment of a picture display device according to the invention is characterized in that the video drive circuit is adapted to sequentially write the video signal received from the video signal processing circuit and to apply, in parallel, video information of a line to be displayed to drive electrodes of the juxtaposed sources. A conversion from a serial to a parallel signal is then realised in a simple manner.

A further object of the invention is to provide a picture display device in which the drive for selecting lines and, for example, colour lines is simplified.

An embodiment of a picture display device according to the invention is therefore characterized in that the active selection structure comprises a preselection structure having extraction locations which can be activated and communicate row by row with the transport ducts and a selection plate having apertures which can be activated and are each associated with a pixel, each activatable extraction location of the preselection plate being associated with at least two activatable apertures of the selection plate.

A further object of the invention is to further reduce the number of drivers.

An embodiment of a picture display device according to the invention is therefore characterized in that the number of drive voltages to be supplied by the second drive circuit corresponds to the number of fine-selection electrodes in a group, each first fine-selection electrode of a group being coupled to each first fine-selection electrode of the other groups, and each subsequent fine-selection electrode being coupled to each corresponding subsequent fine-selection electrode of the other groups.

A further object of the invention is to improve the contrast of the displayed picture. A picture display device according to the invention is therefore characterized in that an auxiliary (or dummy) electrode for intercepting unwanted electrons is arranged between each extraction location and the associated selection apertures.

A further object of the invention is to reduce the number of drivers in the presence of auxiliary electrodes.

An embodiment of a picture display device according to the invention is characterized in that a plurality of groups of fine-selection electrodes jointly constitute a section and in that the fine-selection electrodes are spread over a number of sections, each fine-selection electrode of a section being sequentially selected by means of the second drive circuit, each first fine-selection electrode of a section being coupled to each first fine-selection electrode of the other sections and each subsequent fine-selection electrode of a section being coupled to the corresponding subsequent fine-selection electrode of the other sections, the dummy electrodes of one or more sections being coupled together and being provided, in operation, with the desired voltage(s) from the third drive circuit.

A further embodiment of a picture display device according to the invention is characterized in that the sources for emitting electrons comprise a line cathode which is coupled to a voltage source.

A further object of the invention is to improve the uniformity of the different transport ducts.

A further embodiment of a display device according to the invention is therefore characterized in that the picture display device comprises a uniformity control which is provided with detector means for measuring a test signal applied to the video drive circuit during the field retrace time and transported through the transport ducts.

A further embodiment of a picture display device according to the invention is characterized in that the video drive circuit comprises, for each drive electrode to be driven, a block of write switches for writing the video signal coming from the video signal processing circuit, a block of sample-and-hold capacitors for storing samples of the video signal, a block of read switches for reading the video signal stored in the block of sample-and-hold capacitors, and a comparator for applying the video information of the relevant pixel to the relevant drive electrode.

BRIEF DESCRIPTION OF THE DRAWINGS

The invention will be described in greater detail by way of example with reference to the accompanying drawings drawing figures in which:

FIGS. 9A and 9B show diagrammatically the fine-selection electrodes with the drive circuit, FIGS. 10A and 10B show an embodiment for reducing the number of drivers of the fine-selection electrodes.

DESCRIPTION OF THE PREFERRED EMBODIMENTS

Figure 1A:
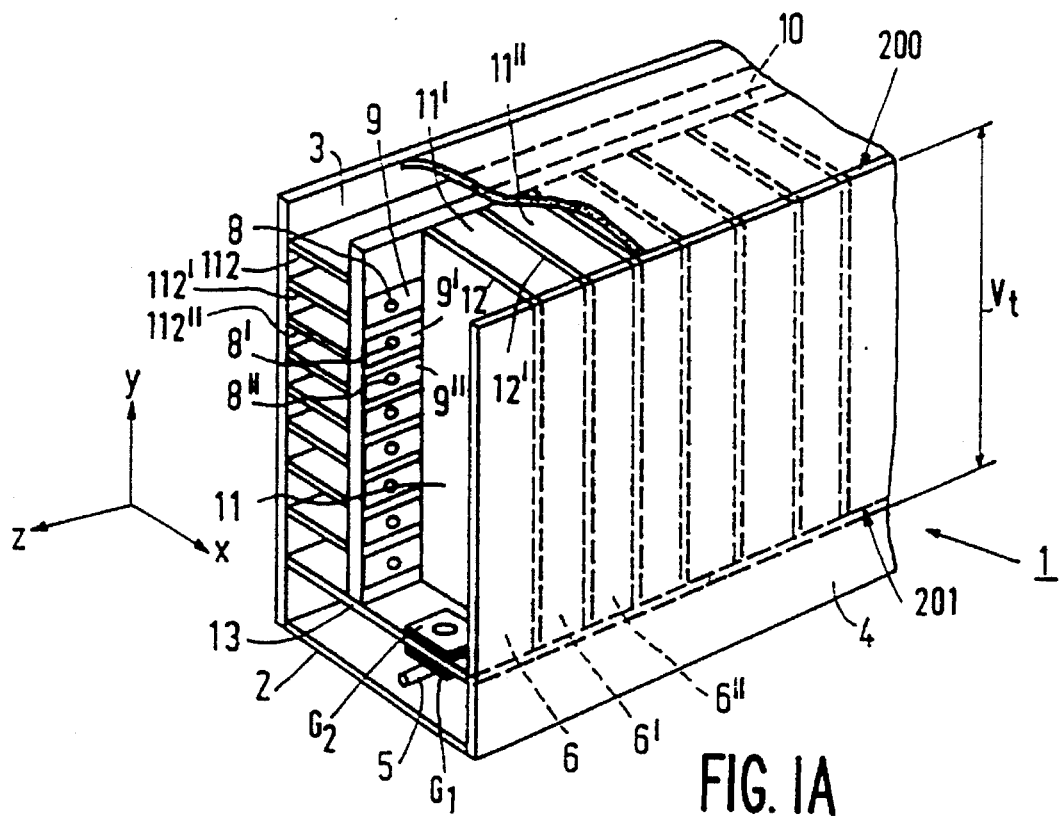
FIG. 1A is a diagrammatic perspective elevational view, partly broken away, of a display unit as can be used in a display device according to the invention.
Figure 1B:
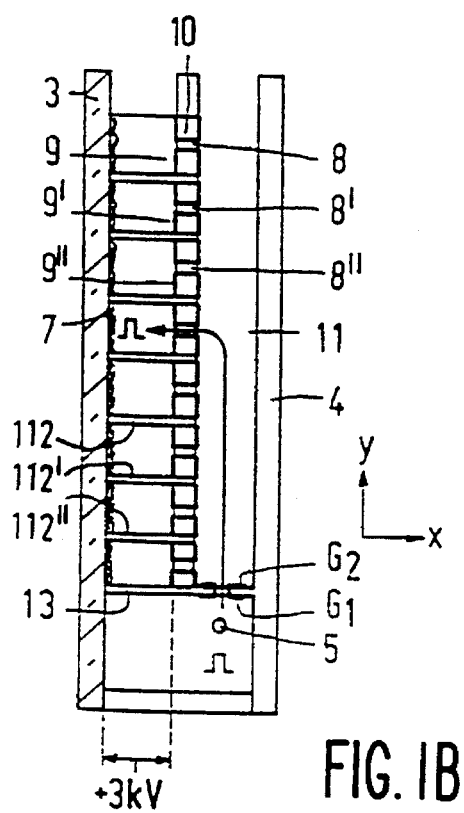
FIG. 1B is a cross-section through the display unit of FIG. 1A.

FIGS. 1A and 1B show a flat-panel display unit 1 of a picture display device according to the invention, having a display panel (window) 3 and a rear wall 4 located opposite said panel. A luminescent screen 7 having a repetitive pattern (rows or dots) of, for example triplets of red (R), green (G) and blue (B) luminescing phosphor elements (or monochrome elements) is arranged on the inner surface of window 3. To be able to supply the required high voltage, the luminescent screen 7 is either arranged on a transparent, electrically conducting layer (for example, ITO) or is provided with an electrically conducting layer (for example, AL backing). In a preferred embodiment the (dot-shaped) phosphor elements of a triplet are located at the vertices of a substantially equilateral triangle.

An electron source arrangement 5, for example a line cathode which by means of drive electrodes provides a large number (for example, 600) of electron emitters or a similar number of separate emitters, is arranged proximate to a bottom plate 2 which interconnects display panel 3 and rear wall 4. Each of these emitters is to provide a relatively small current so that many types of cathodes (cold or hot cathodes) are suitable as emitters. Each emitter may be arranged separately or, if they are formed by one line cathode, they may be arranged jointly. They may have a constant or controllable emission. The electron source arrangement 5 is arranged opposite entrance apertures of a row of electron transport ducts extending substantially parallel to the screen, which ducts are constituted by compartments 6, 6', 6", . . . , etc., in this case one compartment for each electron source. These compartments have cavities 11, 11', 11", . . . defined by the rear wall 4 and partitions 12, 12', 12", . . . At least one wall (preferably the rear wall) of each compartment is made of a material which has a suitable high electrical resistance in the longitudinal direction of the compartments for the purpose of the invention (for example, ceramic material, glass, synthetic material (coated or uncoated )) and which have a secondary emission coefficient $\delta>1$ over a given range of primary electron energies. It is alternatively possible to construct (for example, the rear wall) from "isles" insulated from each other (in the longitudinal direction of the compartments) so as to obtain the desired high electrical resistance in the transport direction.

The electrical resistance of the wall material has such a value in the transport direction that a minimum possible total current (preferably less than, for example 10 mA) will flow in the walls in the case of a field strength in the axial direction in the compartments on the order of one hundred to several hundred Volts per cm required for the electron transport. A voltage Vt which generates the field strength required for the transport is provided in operation, between an upper rim 200 and a lower rim 201 of the rear wall 4. By applying a voltage on the order of several dozen to several hundred Volts (value of the voltage is dependent on circumstances) between the row 5 of the electron sources and grids G1, G2 arranged at inputs of the compartments 6, 6', 6", . . . , electrons are accelerated from the electron sources towards the compartments, whereafter they impinge upon the walls in the compartments and generate secondary electrons. The electrons can be withdrawn, for example, line by line from the compartments via apertures 8, 8', . . . in a selection plate 10 energized by means of electrodes 9, 9', . . . , (see FIG. 1A), and accelerated towards the luminescent screen 7 by means of an acceleration voltage applied, in operation, between the selection plate and the luminescent screen. Horizontal partitions 112, 112', 112", . . . are arranged between the display panel 3 and the selection plate 10. Instead of the partitions shown, it is alternatively possible to use apertured plates.

The invention utilizes the aspect disclosed in European Patent Applications EP-A-400 750 and EP-A-436 997 that vacuum electron transport within compartments having walls of electrically insulating material is possible if an electric field ($E_y$) of sufficient power is applied in the longitudinal direction of the compartment. The contents of European Patent Applications EP-A-400 750 and EP-A-436 997 are herein incorporated by reference.

FIGS. 1A and 1B show the principle of a display unit operating with single selection (as described hereinbefore).

Figure 2A:
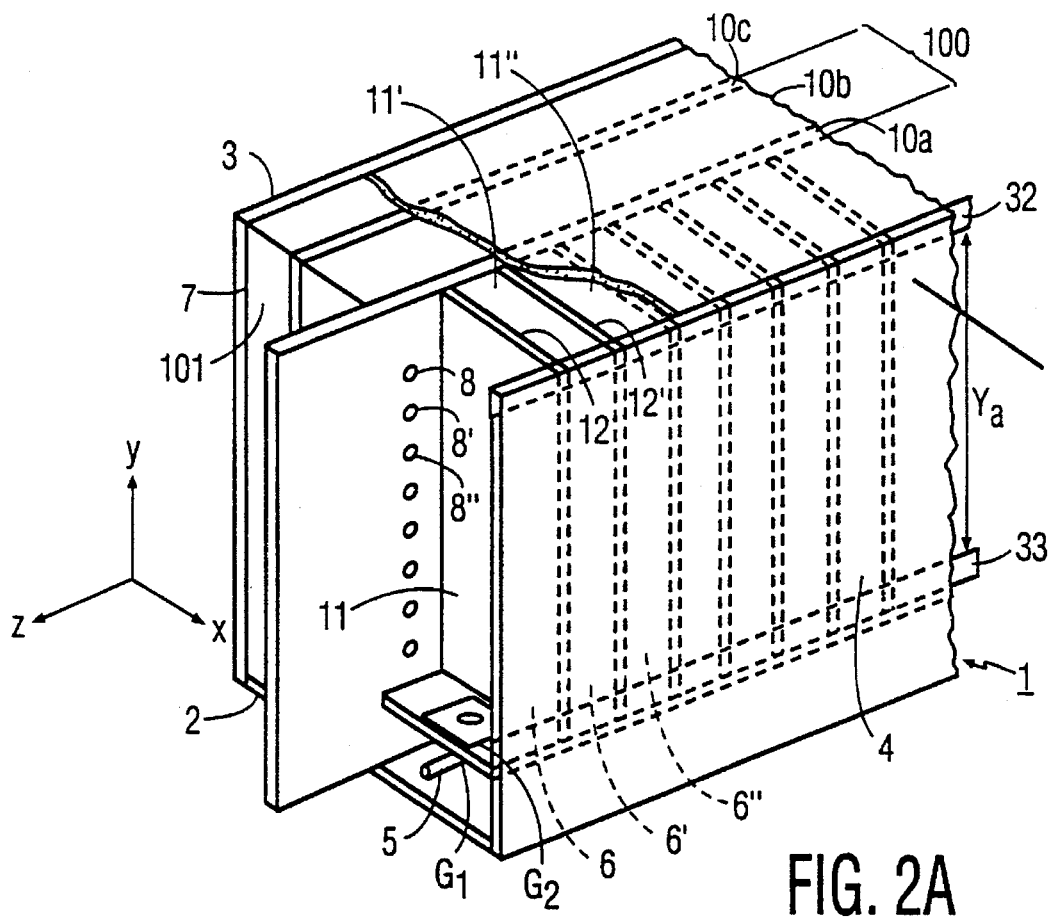
FIG. 2A is a diagrammatic perspective elevational view, partly broken away, of a display unit as can also be used in the display device, which display unit has a preselection and a fine selection.
Figure 2B:
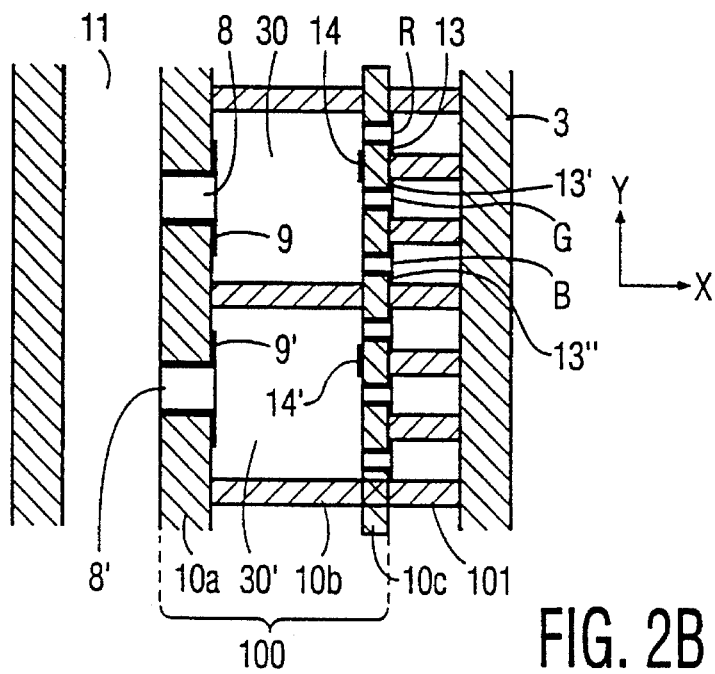
FIG. 2B is a cross-section through the display unit of FIG. 2A.

FIGS. 2A and 2B show the principle of stepped selection. Stepped selection is herein understood to mean that the selection from the compartments 6, 6', 6", . . . to the luminescent screen 7 is realised in at least two steps: a first (coarse) step for selecting, for example, the pixels and a second (fine) step for selecting, for example, the pixel colors. The space between the compartments and the luminescent screen 7, which is arranged on the inner wall of display panel 3, accommodates an active colour selection system 100 which comprises an (active) preselection plate 10a, a spacer plate 10b and an (active) (fine) selection plate 10c. Structure 100 is separated from the luminescent screen 7 by a flu-spacer structure 101, for example an apertured electrically insulating plate.

FIG. 2B shows in a diagrammatical cross-section a part of the display device of FIG. 2A in greater detail, particularly the active colour selection plate structure 100 which comprises a preselection plate 10a with extraction apertures 8, 8', 8", . . . and a fine-selection plate 10c with groups of apertures R, G, B. The apertures R, G, B are generally positioned in a triangle, but for the sake of clarity all three of them have been shown in the cross-section in FIG. 2B. Each extraction aperture 8, 8', etc. is associated with three fine-selection apertures R, G, B in this case. Other numbers are alternatively possible, for example 6 fine-selection apertures for each preselection aperture, etc. An intermediate spacer structure 10b is arranged between the preselection plate 10a and the fine-selection plate 10c. This structure accommodates communication ducts 30, 30', 30", . . . having a cross-section which is chosen to suit the shape of the phosphor colour pixels (for example, circular or triangular triplets).

The electron transport ducts 6, 6', 6", . . . are formed between the structure 100 and the rear wall 4. To be able to draw the electrons from the transport ducts 6, 6', 6", . . . via the apertures 8, 8', 8", . . . , pierced metal preselection electrodes 9, 9', 9", . . . are arranged on the screen-sided surface of the plate 10a.

The walls of the apertures 8, 8', . . . are preferably metallized completely or partly, but there is preferably no or little electrode metal on the surface of plate 10a on the side where the electrons land. This is done to ensure that no electrons remain on a selection electrode during addressing (i.e. the electrode must draw a minimum current).

Another solution to the problem of drawing current is to ensure that there is electrode metal on the selection surface where the electrons land, but this metal should be given such a large secondary emission coefficient that the preselection electrodes do not draw any net current.

Similar to the plate 10a, the screen-sided surface of the apertured fine-selection plate 10c is provided with (fine) selection electrodes 13, 13', . . . for realising, for example colour selection. Here again the apertures are preferably metallized completely or partly. The possibility of electrically interconnecting fine-selection electrodes is important in this respect. In fact, a preselection for each pixel has already taken place and, in principle, electrons cannot land at the wrong location (on the wrong pixel in this example). This means that, in principle, only one group or a small number of groups of three separate fine-selection electrodes is required for this form of fine selection. For example, the drive is effected as follows, but there are also other possibilities. The preselection electrodes are brought to a potential substantially linearly increasing with the distance to the electron source arrangement 5, for example, by means of suitable voltage dividing resistors.

One or more picture lines are selected by applying a positive voltage pulse of, for example, 200 V to the desired preselection electrodes used for selecting these picture lines. Colour pixels are addressed by applying shorter pulses having an amplitude of, for example 300 V to the fine-selection electrodes. The fine-selection electrodes preferably have such an electrical resistance, or are connected to external resistors in such a way that they safeguard the electronic circuits (controlling the drive) against breakdown from the luminescent screen.

Figure 3:
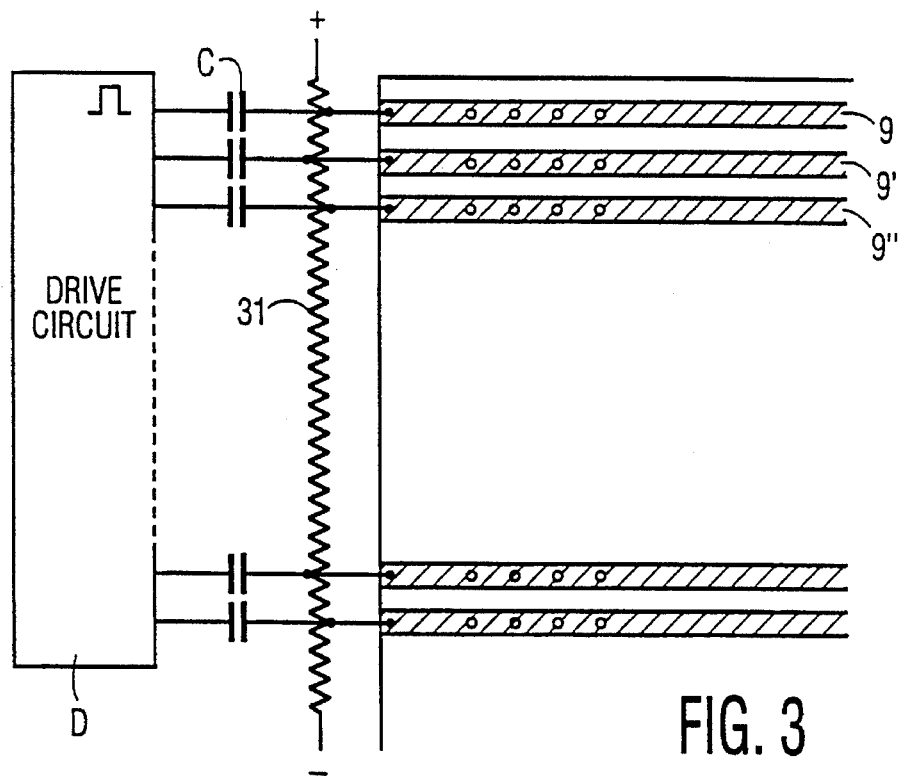
FIG. 3 shows a part of a selection electrode drive circuit for use in a display device according to the invention.

FIG. 3 shows diagrammatically a drive circuit for the preselection (or line selection) electrodes. In this diagram each preselection electrode 9, 9', . . . is driven by a drive circuit D1 via a capacitor C.

The preselection electrodes are subjected to a linearly increasing DC voltage by connecting them to voltage dividing resistors 31. These voltage dividing resistors may be arranged proximate to or on the rim of the plate carrying the preselection electrodes, which is plate 10a in FIG. 2. The voltage dividing resistors are connected to a voltage source so that the selection electrodes receive the correct potentials, i.e. there is a suitable transport field along the length of the compartment. The exact value of the difference depends on various factors: the difference voltage is adjusted in such a way that the display is black in the absence of selection pulses. In order to locally apply a voltage pulse to the preselection electrode to be selected, each preselection electrode is connected to the drive circuit D1 via respective capacitor C. It is advantageous to cause the plate carrying the preselection electrodes to project from the other plates (see FIG. 1). It may then also be used to carry the capacitors C and particularly the drive circuit D1. To realise this, known techniques such as "chip on glass" or "tape-automated bonding (tab)" can be used.

Let it be assumed that the (double) colour selection system has three fine-selection electrodes for each preselection electrode. A pulse of, for example 200 V is applied to the coarse electrode for, for example, 60 μs and pulses of, for example, 250 V are applied to the fine-selection electrodes for, for example, 20 μs. This is repeated for the subsequent electrodes, etc. It must of course be ensured that the line selection pulses are representative of the video information. The video information representing, for example, a (colour) line is applied, for example in parallel to all G1 electrodes in the form of a time (or pulse amplitude -) modulated signal.

To ensure that no electrons land at the wrong location (i.e. on a non-selected pixel), which would be at the expense of contrast and colour purity, an auxiliary or dummy electrode 14, 14', . . . is arranged on the part of the surface of the fine-selection plate 10c located opposite each extraction aperture 8, 8', . . . (see FIG. 2A). These dummy electrodes 14, 14', . . . ensure that electrons which might come from a non-addressed preselection aperture (referred to as high "hop" electrons) are collected so that they cannot reach the luminescent screen. No particular position of these dummy electrodes is essential, as long as they are positioned between the preselection and the fine-selection electrodes. To realise collection of the above-mentioned electrons, it is advantageous to ensure that the (horizontal) communication ducts formed in the spacer structure 10b between the preselection plate 10a and the fine-selection plate 10c are always in the transport mode by giving the fine-selection electrodes and the dummy electrodes a positive voltage with respect to the corresponding preselection electrodes. The dummy electrodes of the non-addressed colour pixels are brought to a higher voltage than the fine-selection electrodes of non-selected pixels. To this end the fine-selection electrodes are connected to a drive circuit D2 and the dummy electrodes are connected to a drive circuit D3 which will hereinafter be described. This guarantees a perfect contrast because "high hop electrons" cannot reach the luminescent screen but are collected by the dummy electrodes. When a colour pixel is being addressed, the relevant fine-selection electrode is brought to a higher voltage than the dummy electrode associated with this pixel.

All fine-selection electrodes are given the same voltages. This provides the possibility of essentially simplifying the fine selection, as will be described hereinafter. An additional advantage of giving the different. (non-selected) fine-selection electrodes the same voltage is that the post-acceleration voltage to the luminescent screen is the same throughout the display so that there cannot be any variation in brightness in the direction of the transport ducts. This is particularly important in the case of larger sized devices in which the cathodes are preferably arranged centrally (perpendicularly to the ducts). By using, for example, a plurality of line cathodes (at, for example, ¼ and ¾ of the height of the rear wall 4) in the case of larger sized devices, it is also possible to give the fine-selection electrodes the same voltages. A minor drawback of the structure shown in FIG. 2 is that the intermediate spacer structure 10b must have a relatively large thickness so as to enable the dummy electrodes 14, 14', . . . to capture unwanted electrons which are going "straight on".

Figure 4:
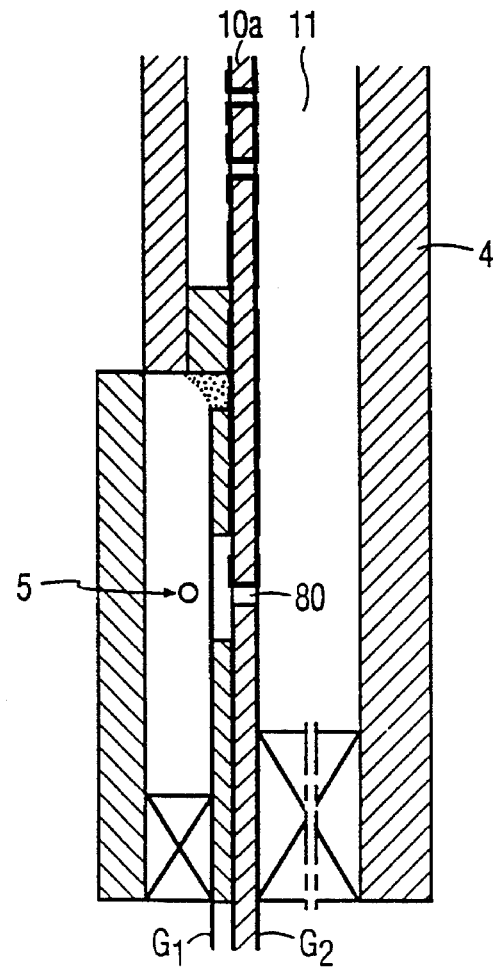
FIG. 4 shows an embodiment of an electron source arrangement for use in a display device according to the invention.

FIG. 4 shows diagrammatically an entrance portion of an electron transport duct 11 which is an alternative to the structure shown in FIG. 1 (in which the electrons are injected through an entrance aperture 80 in the bottom of the transport duct 11). The structure shown in FIG. 4 is characterized in that the electrons emitted by the cathode wire 5 (electron source arrangement) are injected through an entrance aperture 80 in a wall of the transport duct. A (pierced) G1 electrode is associated with each entrance aperture 80, which electrode is connected to means for injecting electrons in dependence upon the video signal (for which a voltage swing of several dozen Volts is required), while a G2 electrode is associated with all entrance apertures combined, with which electrode, inter alia the entrance energy of the electrons which are being injected can be controlled. In this type of structure the entrance apertures of the transport ducts may be arranged in the preselection plate or in the rear wall. They may be arranged, for example at the lower or upper side, or in the middle, or at the lower and upper sides and in the latter case in the middle between the "upper" and "lower" sides, or they may be arranged in accordance with a further partitioning. This is advantageous, particularly in larger display units. If desired, it is even possible to arrange the entrance apertures off-centre. The transport voltages which are required to draw the electrons up and down in the ducts are then different.

To minimize the electron transport voltage, the transport ducts should be as broad as possible. To realise this, the pitch of the transport ducts and the pitch of the triplets of pixels are recoupled. It is then possible, for example, to address two juxtaposed triplets from one transport duct (instead of two) by means of one electron emitter section (instead of two). It is also possible to use two subjacent apertures for this purpose, which apertures jointly provide, for example, six fine-selection apertures with electrons. In that case the double number of preselection electrodes is required and the emitters must be driven twice as fast. An example of such a twofold preselection is shown diagrammatically in FIG. 5. Each preselection electrode 42 is divided into two apertured sub-electrodes 43a and 43b in the manner shown, which simplifies contacting. In this way the horizontal resolution can be doubled without having to change the mode of operating the transport ducts 6, 6', 6", ... (each cooperating with one electron emitter). Three fine-selection apertures in a fine-selection plate for selecting the colours red (R), green (G) and blue (B) are associated with each preselection aperture 44, 44', ..., as is shown diagrammatically in FIG. 2B. The system described can be operated in the "multiplex" mode. This means that, for example two triplet columns and hence six pixels can be driven (multiplexer) in one line period by means of one electron emitter. Other multiplex schemes are alternatively possible. In the case shown, the grid G1 defines the quantity of electrons injected into the compartments 6, 6', 6", ... under the control of a video drive circuit 34.

The flu-spacer plate 101 in FIGS. 2A and 2B may have such an apertured pattern that each flu-spacer aperture connects one fine-selection aperture with one pixel color on the luminescent screen. In that case an optimum colour purity is guaranteed. However, it is alternatively possible to make the aperture pattern in such a way that each flu-spacer aperture connects more than one fine-selection aperture with more than one pixel. (This reduces the risk of breakdown. A tapered aperture shape may also be advantageous in this respect.)

The stepped selection structure has been described hereinbefore in relation to colour selection. However, the stepped selection structure can also be used to advantage for a monochrome luminescent screen so as to obtain a high resolution with a minimum number of connections and drive circuits.

It is to be noted that, in principle, the length of the electron transport ducts and the number of juxtaposed transport ducts are unimportant for the picture quality. Any aspect ratio for a display screen having a short axis and a long axis is thus possible, for example 4:3, 16:9, 14:9. The electron transport ducts are generally arranged parallel to the short display screen axis, but in some cases it may be advantageous to arrange them parallel to the long axis. Furthermore, it may be interesting for specific applications to have a square display unit, which is also certainly possible when using the display device according to the invention.

Figure 6:
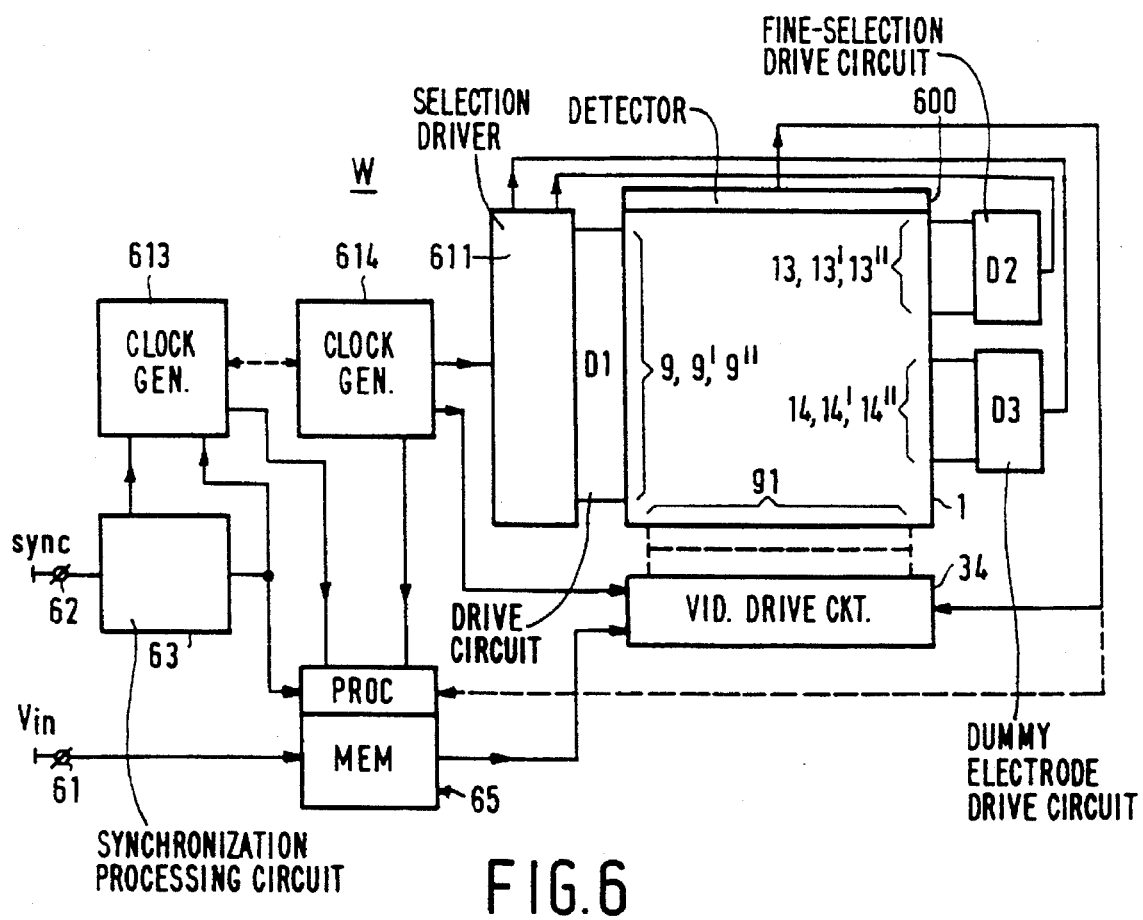
FIG. 6 shows diagrammatically a display device according to the invention.

FIG. 6 shows a display device W according to the invention. The display device receives an input video signal Vin at an input 61. The input video signal Vin is applied to a video signal processing circuit 65. The display device receives a synchronizing signal sync at an input 62. The input 62 is connected to a synchronization processing circuit 63. This synchronization processing circuit supplies synchronizing signals to a clock generator 613 and defines the television standard of the incoming video signal. The incoming video signal may comprise, for example Y, U, V signals (or R, G, B signals). If the incoming video signal comprises Y, U, V signals, a conversion to R, G, B signals will have to take place in the video signal processing circuit 65 so that ultimately the different phosphors (red, green and blue) can be driven on the display panel 3. This conversion of Y, U, V signals to R, G, B signals may be effected by means of a matrix circuit. It is possible to carry out this conversion before the video signal is written into the memory MEM, or during the processing operation in the video signal processing circuit 65, or after the video signal processing circuit 65.

The video signal is stored, for example, line sequentially in the video signal processing circuit 65 under the control of a write clock which is generated, for example, by the clock generator 613. The video signal is supplied line by line (for example, for each colour line (R, G, B) in the case of a colour display screen) at an output of the video signal processing circuit under the control of a read clock generated by a clock generator 614 and is applied to the video drive circuit 34. In this video drive circuit the video information of, for example a (colour) line is written under the control of the clock generator 614 and subsequently applied in parallel to the G1 (or G2) electrodes which are arranged at the inputs of the compartments 6, 6', 6", ... (see FIG. 1) of the display unit 1, after which the video information is displayed on the display panel 3. The lines and pixels are selected by means of a selection driver 611. The selection driver is controlled by a clock signal from clock generator 614. After each clock pulse, the drive circuit D1 applies new drive voltages to the selection electrodes 9, 9', 9" ... under the control of the selection driver 611 (see also FIG. 1A). The selection driver receives the information about the drive voltages, for example, from a look-up table or from an EPROM. The display unit 1 has a structure as described hereinbefore (see FIG. 1A).

The synchronization processing circuit 63 defines the line frequency, the field frequency with reference to the incoming video signal, and if the display device is suitable for displaying video signals of different TV standards and/or different aspect ratios, for example also the TV standard and the aspect ratio.

The video signal processing circuit 65 stores the incoming video signal, for example, line-sequentially in a memory MEM associated with the video signal processing circuit, under the control of a control section PROC. The control section receives information (if necessary) about the relevant TV standard and the aspect ratio from the synchronization processing circuit. The control section further receives the write clock and the read clock for writing and reading the video signal, respectively, from the clock generators 613 and 614. The control section may also ensure conversion to the double field frequency.

If the number of incoming video lines stored in the memory does not correspond to the number of display lines associated with the display unit, the video processing circuit is to ensure a line and pixel distribution associated with the display unit. The incoming video signal having n lines (dependent on the standard) must be converted by the video processing circuit into a video signal having m lines (the number of lines of the display panel 3). There are two possibilities, namely either n>m or n<m (At n=m the video signal does not need to be converted.).

If n>m, the number of lines must be reduced. The simplest method is to pass a given number of lines unchanged and subsequently omit one line and then pass the given number of lines unchanged again. A more complicated method is to obtain the desired number of lines by means of interpolation techniques. In these techniques, for example a number of lines x is converted into a number of lines x−1, while a number of the x lines receives new information by means of filtering and the like, necessary inter alia to prevent aliasing.

If n<m, the number of lines must be increased. The simplest method in this case is to pass a given number of lines unchanged and subsequently repeat the last line of a group, whereafter the given number of lines is passed unchanged again. All kinds of methods are possible to obtain this conversion. In this case it is also possible to make use of all kinds of interpolation techniques. A number of lines y may be converted into a number of lines y+1, while a number of the y lines receives new information.

All kinds of filtering operations and the like are required again. If the video signal is not interlaced, but is displayed by way of a progressive scan, a conversion to a non-interlaced video signal will have to take place from the video drive circuit 34 between the instant when the interlaced video signal is applied to the input 61 and the instant of display. In that case, it is advantageous to realise this conversion before the other operations (such as aspect ratio matching, standard conversion, etc.) are carried out.

Both in the case of n<m and n>m a sample rate conversion is necessary to convert the number of lines to be displayed and the number of pixels to be displayed into the (fixed) parameters of the display panel 3. This is effected by adapting the clock signals.

In the case of n>m the number of lines must be reduced, which presents an additional problem because higher frequencies from the video signal must now be prevented from aliasing and hence disturbing the picture. To prevent these and other forms of aliasing (also at n< or =m) a diagonal filter is used which is adapted to the pattern of pixels of the display panel 3.

If desired, the incoming video signal may be converted at a field frequency of 50 (or 60) Hz into a video signal at a field frequency of 100 (or 120) Hz. This is done to eliminate the troublesome flickering of the picture. The field frequency can be converted from 50 (60) Hz to 100 (120) Hz either directly after the video signal is received at the input 61 or after the above-described aspect ratio conversion, standard conversion, etc. have taken place.

The video signal may be written into the memory MEM in the form of R, G and B signals. After processing under the control of the control section PROC, the video signal is read out, for example, in the form of R, G, B signals again.

Figure 7:
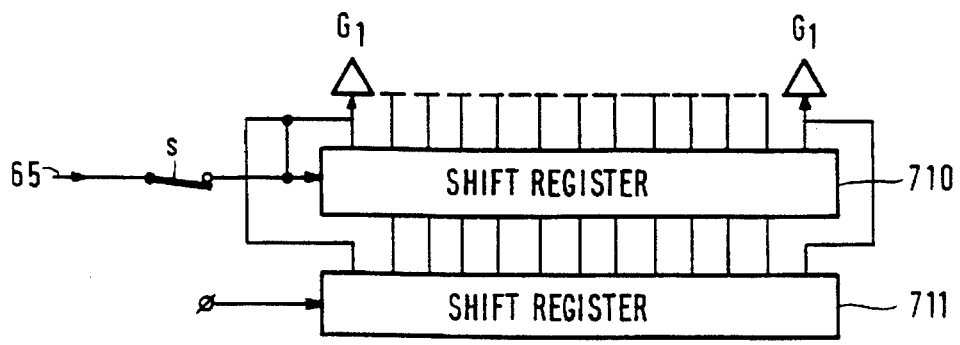
FIG. 7 shows a part of an embodiment of a video drive circuit.

The video drive circuit 34 comprises, for example a shift register (as shown diagrammatically in FIG. 7) for serially writing video information of a line and parallel reading out and for applying, via modulators and output amplifiers, the video information of each pixel (for each colour) to the relevant grid G1 of the relevant portion of the line cathode (as shown, inter alia in FIGS. 1A and 2A). The grid G1 is separately driven for each compartment 6, 6', 6", ... with the video information as written into, for example one of the two shift registers 710, 711. A switch S switches between the two shift registers 710 and 711. Since the video information of the next (colour) line must be written again during the period when the video information of one (colour) line is being applied to the grid G1 (via output amplifiers), it is advantageous to make use of the two shift registers 710, 711 and the switch S (FIG. 7). The shift registers 710 and 711 are switched synchronously with the switch S between serial writing and parallel reading. If the video information of the video signal processing circuit 65 is applied to the shift register 710, this shift register is switched in to the serial write position and the shift register 711 is switched in to the parallel read position, and conversely.

To obtain more freedom in determining the sequence in which the pixels are driven, it is advantageous to give the shift registers 710, 711 a triple design so that a total number of six shift registers is used, each pair of shift registers storing one colour line and applying it to the grid.

In given situations it may be advantageous to split up each shift register into a plurality of sub-shift registers. A part of a (colour) line is then stored in each sub-shift register. The number of connections between the video signal processing circuit 65 and the video drive circuit determines to what extent the video information of each (colour) line is split up into sub-lines. By increasing the number of connections and making the video drive circuit 34 more complex, the rate at which the video information of the video signal processing circuit 65 must be passed on to the video drive circuit 34 can be decreased. Conversely, the number of connections can be limited if the rate is increased. Dependent on the connections used and on the video signal processing circuit and video drive circuit used, an optimum is determined between the video information transmission rate and the number of connections (and hence the complexity of the video drive circuit).

Figure 8A:
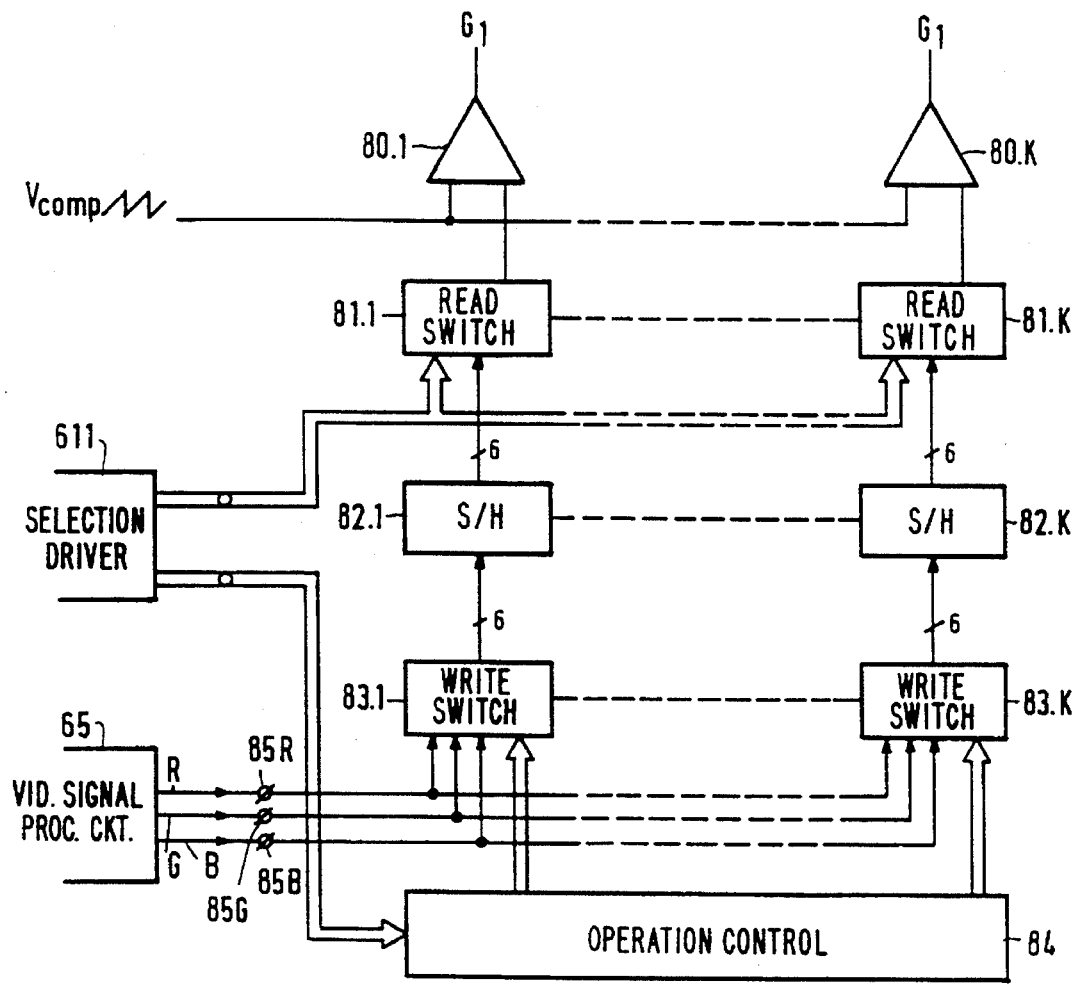
FIG. 8A shows diagrammatically an embodiment of a video drive circuit with sample-and-hold capacitors.

FIG. 8A shows a further embodiment of the video drive circuit 34, partly in a block diagram. The video information of the colour lines R, G, B is applied from the video signal processing circuit 65 to the video drive circuit 34 at input 85R, 85G and 85B. The video drive circuit 34 comprises for each G1 to be driven (i.e. for each compartment 6, 6', 6", . . . see FIG. 1) a comparator (80.1, . . . , 80.K), a block of read switches (81.1, . . . , 81.K), a block of sample-and-hold capacitors (82.1, . . . , 82.K) and a block of write switches (83.1, . . . , 83.K). K denotes the number of compartments of the display unit 1. The block of write switches is connected to the inputs 85R, 85G and 85B and connects each of these inputs to two outputs. Each block of write switches is thus connected via a sixfold connection to a corresponding block of sample-and-hold capacitors. A block of sample-and-hold capacitors comprises six sample-and-hold capacitors (two for each colour). To ensure that a subsequent (colour) line can be written at the instant when a (colour) line is applied to the grid G1, it is necessary to double these sample-and-hold capacitors (six instead of three). Each block of sample-and-hold capacitors is connected to a corresponding block of read switches via a sixfold connection. Each block of read switches connects the six inputs to one output, which output is connected to a first input of a corresponding comparator. Each comparator receives a substantially sawtooth-shaped signal Vcomp at a second input. Dependent on the voltage (video information) stored in the relevant sample-and-hold capacitor, the relevant comparator will supply a signal for a longer or shorter time to the grid G1 so that a larger or smaller number of electrons is injected into the relevant compartment. The comparators 80 thus function as pulse duration modulators. By giving the sawtooth-shaped signal a predetermined variation, it is possible to obtain gamma correction. The pulse at the drive electrode G1 may be simultaneously modulated with such a sawtooth. By nature, this yields a stronger gamma correction effect.

The video drive circuit 34 is controlled by the selection driver 611. The selection driver applies a bus signal to an operation block 84 associated with the video drive circuit, which operation block controls the blocks of write switches 83.1, . . . , 83.K. The video information received at the inputs 85R, 85G and 85B is thereby sequentially applied to the blocks of sample-and-hold capacitors 82.1, . . . , 82.K. The selection driver also applies a second bus signal to the video drive circuit 34. This second bus signal controls the blocks of read switches 81.1, . . . , 81.K in parallel for simultaneously reading the video information of a (colour) line to be displayed from the corresponding sample-and-hold capacitors.

If two preselection apertures (see, for example FIG. 5) instead of one preselection aperture 8, 8', 8", . . . is present per compartment 6, 6', 6", . . . , the video drive circuit will have to be adapted thereto. The number of write switches in the blocks 83.1, ..., 83.K doubles, the connection between each block of write switches and the corresponding block of sample-and-hold capacitors now become twelvefold instead of sixfold, the number of sample-and-hold capacitors for each block doubles, the connections between each block of sample-and-hold capacitors and the corresponding block of read switches also become twelvefold instead of sixfold and the read switch for each block now connects one of twelve inputs to the relevant comparator.

It will be evident that the video drive circuit 34 must be adapted accordingly in the case of a different division of preselection apertures and fine-selection apertures per line and per compartment.

Figure 8B:
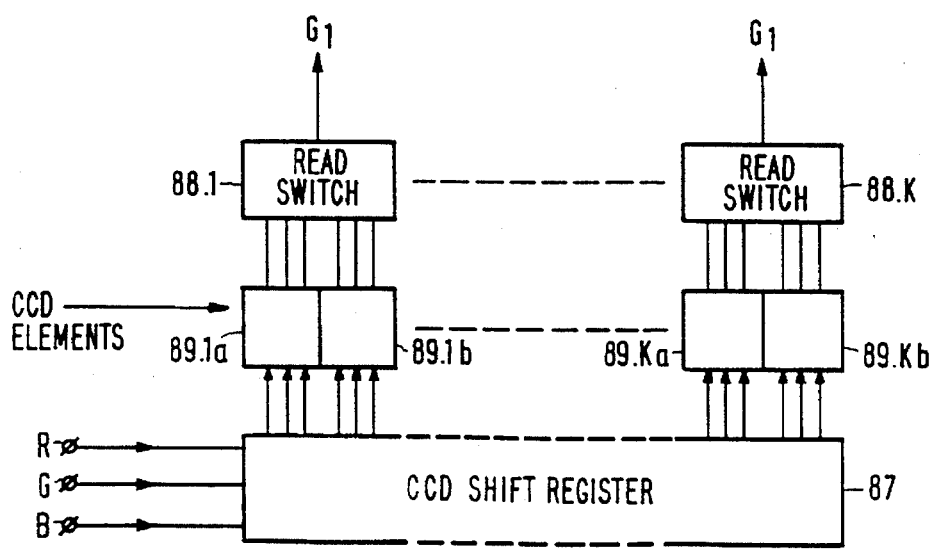
FIG. 8B shows diagrammatically an embodiment of a video drive circuit with charge-coupled devices.

FIG. 8B shows, partly in a block diagram, an embodiment in which use is made of CCDs (charge-coupled devices). Also in this embodiment the video drive circuit receives the three different colour lines R, G and B at three inputs. These three colour lines are applied in parallel to a threefold CCD shift register 87. After the three colour lines have been written into this shift register, the three colour pixels of all pixels of a line are each simultaneously written into a CCD element 89.1, ..., 89.K. Each CCD element comprises two sub-elements 89.1a/89.1b, ..., 89.Ka/89.Kb. After the three colour lines have been written into the CCD shift register 87, the video information is transferred (for example to the sub-elements 89.1a, ..., 89.Ka). While the video information is being read from these sub-elements via blocks of switches 88.1, ..., 88.K, the video information of the next line (three colour lines R, G and B) is applied from the CCD shift register to the sub-elements 89.1b, ..., 89.Kb.

Also in this embodiment the clock generator 614 (FIG. 6) will control the CCD shift register 87 and the blocks of switches 88.1, ..., 88.K.

The display unit may comprise, for example a detector 600 (see FIG. 6) as described in European Patent Application EP-A-400 750. During the field retrace time a test signal is applied to the video input of the video drive circuit 34, for example, during a number of line trace periods. The detector is arranged above the display unit 1 in this example and comprises a measuring element for each compartment 6, 6', 6", ..., which element measures the number of electrons entering the top of the relevant compartment. The detector compares the measurements of all measuring elements (for example, with a reference signal) and supplies a signal to compensate for this difference. The detector thus detects a possible difference between the different ducts, which difference can be corrected in the video drive circuit itself or is fed back to the video signal processing circuit 65 in which the required correction is performed together with the different processing operations.

Under the control of the clock generator 614 the selection driver 611 defines the selection signals with which the different (colour) lines must be successively selected. The selection driver controls the drive circuit D1 which is coupled to the (pre)selection electrodes 9, 9', 9", ... If a stepped selection is used in the display device, the selection driver 611 also controls a drive circuit for fine selection D2. This fine-selection drive circuit D2 is then coupled to the fine-selection electrodes 13, 13', 13", ... The selection driver 611 will also drive a dummy electrode drive circuit D3 if the display device comprises dummy electrodes 14, 14', 14", ... (to enhance the contrast). This dummy electrode drive circuit drives the dummy electrodes 14, 14', 14", ..., (see FIG. 6). The drive circuit D1 may comprise, for example, voltage dividing resistors (as is shown in FIG. 3). The voltage dividing resistors are coupled to the selection electrodes for impressing the transport voltage for the electrons in the ducts 6, 6', 6", ... To withdraw the electrons at the desired (colour) line from the ducts, an extra voltage must be applied in situ to the relevant electrode. This extra voltage must be superimposed on the transport voltage and will therefore be applied to the selection electrodes via capacitors. To simplify the drive of the (pre)selection electrodes 9, 9', 9", ..., it is advantageous to construct the drive circuit D1 with integrated circuits (ICs).

As described in European Patent Application EP-A-436 997 the different preselection electrodes 9, 9', 9", ... are successively energized so that the electrons intended for the respective lines can leave the ducts. A selection aperture is then required for each colour pixel so that the number of selection apertures will become very large, certainly for large-size display units. By performing the selection in two or more steps (stepped selection), the drive can be simplified. A number of embodiments in which the number of drives is reduced in the case of stepped selection will now be described.

In a display unit 1 according to the invention a picture can be generated by means of single selection. In this method one picture line is written instantaneously on the display panel 3 instead of pixel-by-pixel writing in conventional cathode ray tubes (CRTs). After a video line has been written into, for example, a shift register (as described above), each display line is applied as a whole to the display unit. In the case of single selection one selection element is required for each (colour) pixel.

As long as the respective (colour) line is not yet written, each selection element should not pass any electrons. When the line is written, each selection element must apply all electrons from the respective duct to the relevant (colour) pixel of the phosphor screen.

In a display device provided with the display unit as described above, the number of drives can be limited if the selection of the electrons from the ducts to the luminescent screen 7 is realised by means of a ("coarse") preselection and a "fine" selection.

It will initially be assumed that the coarse selection (preselection) is controlled per display line. A coarse-selection element is either on or off. When a coarse-selection element is on, the fine-selection block determines which phosphor element (colour) will be driven. Since with coarse-selection elements only one line at a time is on, if a single line cathode is used, the fine-selection blocks of different lines can be switched jointly.

Figure 5:
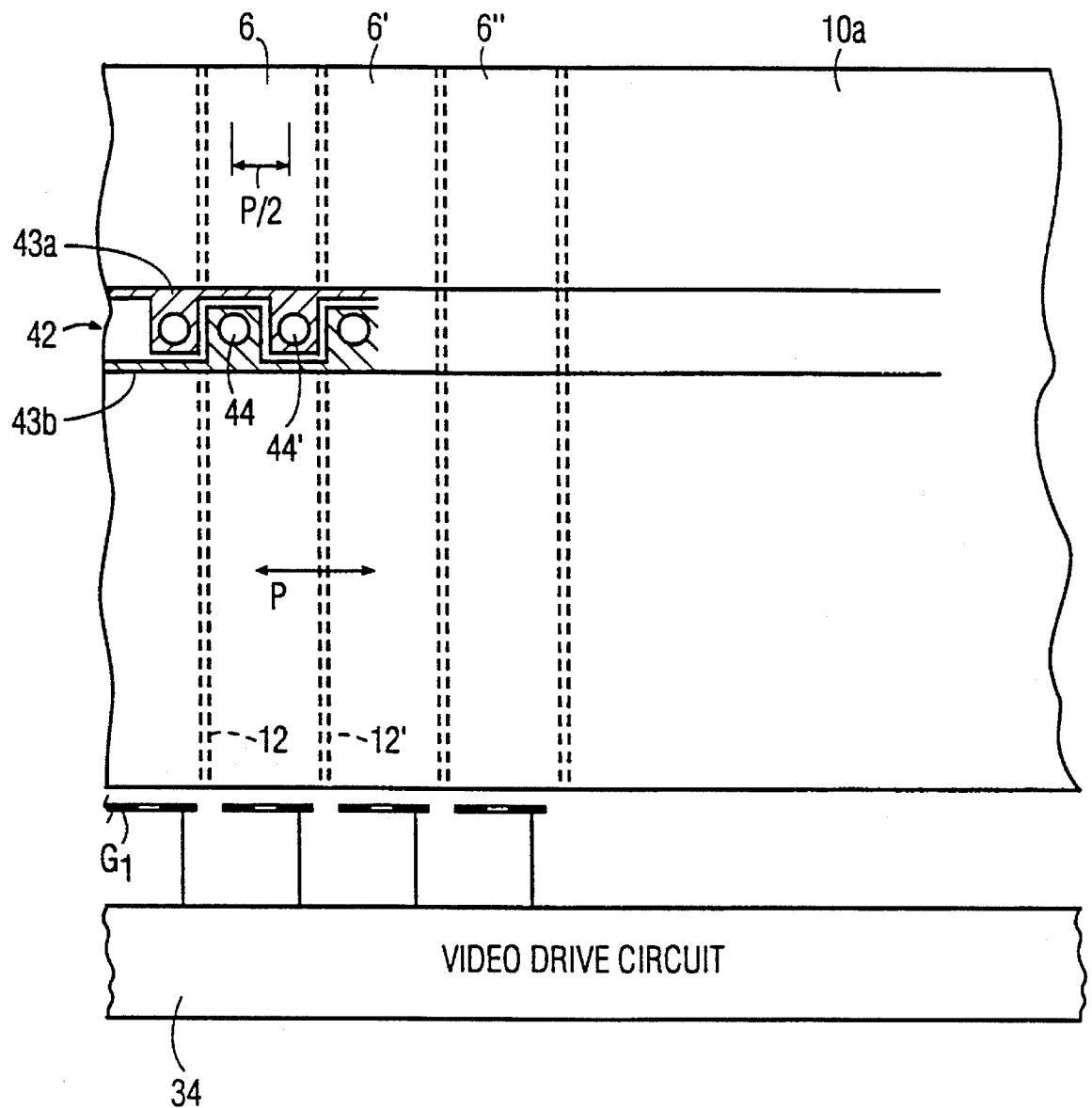
FIG. 5 shows diagrammatically a possible implementation of multiplexing of the preselection electrodes.

In the examples described hereinafter it will be assumed that each compartment is split up per preselection electrode (per line) into two sub-preselection electrodes as shown, for example, in FIG. 5. (Instead of using two preselection apertures which are adjacent to each other per line, it is alternatively possible to use two preselection apertures which are subjacent to each other.) With six fine-selection electrodes on one line per preselection aperture, this yields, for example two pixels with three colour pixels each. It will be evident that if a different mode of multiplexing (for example, three sub-preselection electrodes) or no multiplexing or a different ratio between preselection electrodes and fine-selection electrodes is chosen, the numbers in the examples described hereinafter will change without changing the essence of the modifications.

FIG. 9A shows N groups of 6 fine-selection electrodes (fse) 13, 13', 13", ... which can each be driven separately by means of buffers (bf) each receiving a given fine-selection voltage (Vfs). N is the number of preselection electrodes. These fine-selection voltages are generated by the drive circuit D2 under the control of the selection driver 611.

FIG. 9B shows the fine-selection voltages Vfs plotted against time. In this example each fine-selection voltage successively requires a value during approximately 10 μsec for selecting the relevant fine-selection aperture (for example, a voltage of 200 V). During the rest of the field period the non-selected fine-selection electrodes convey the same voltage. In one line period (for example, 60 μsec) the six fine-selection electrodes associated with one preselection aperture must be successively selected in this example. This is diagrammatically shown in FIG. 9B by means of six voltages Vfs which (with respect to time) successively represent a selection pulse.

FIGS. 10A and 10B show embodiments in which the fine-selection electrodes 13, 13', 13", . . . are interconnected per group. The number of drivers is reduced thereby but each driver must now provide N*N times more power. It is possible to interconnect these groups because the preselection electrodes determine whether the electrons reach the space of the fine-selection electrodes. The fine-selection drive circuit D2 now needs to apply only six different fine-selection voltages Vfs (a, b, c, d, e, f) to the display unit (in this embodiment). These are the six voltages for the first group of fine-selection electrodes. As is shown in FIG. 10A, each first fine-selection electrode of a group is interconnected to all other first fine-selection electrodes of the other groups (the Figure shows the first and the last group of fine-selection electrodes).

The fine-selection voltages to be presented by the fine-selection drive circuit D2 must now be repetitive pulses having a repetition time of 64 μsec (in this embodiment). Now again the respective voltages a, b, c, d, e and f must be offset with respect to time and must each last approximately 10 μsec.

Figure 11:
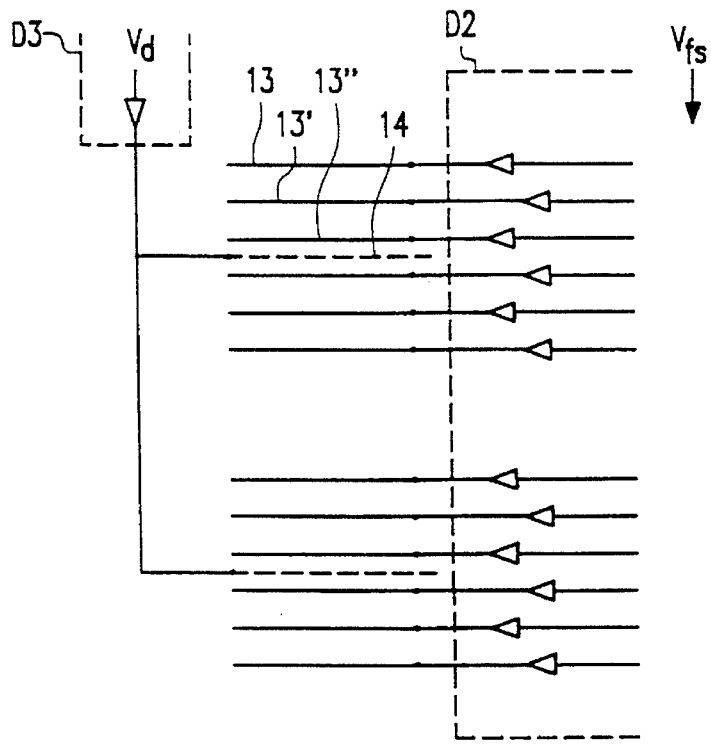
FIG. 11 shows an embodiment of the fine-selection electrodes provided with auxiliary electrodes.

As described, auxiliary or communication dummy electrodes 14, 14', 14", . . . for collecting unwanted electrons in the communication ducts between preselection and fine selection can be used to enhance the contrast of the display unit. Similarly as in FIG. 9, each fine-selection electrode in FIG. 11 is separately driven by means of drivers and fine-selection voltages Vfs, with the aid of the drive circuit D2. To enhance the contrast, one dummy electrode (shown in broken lines in FIG. 11) is used for each fine-selection block of six electrodes. All dummy electrodes are interconnected and driven by means of one driver with a voltage Vd from the dummy electrode drive circuit D3.

The dummy electrodes 14, 14', 14", . . . continuously convey such a voltage in this example that the voltage is higher than the voltage at the non-selected fine-selection electrodes and is also lower than the voltage at the selected fine-selection electrode.

Figure 12:
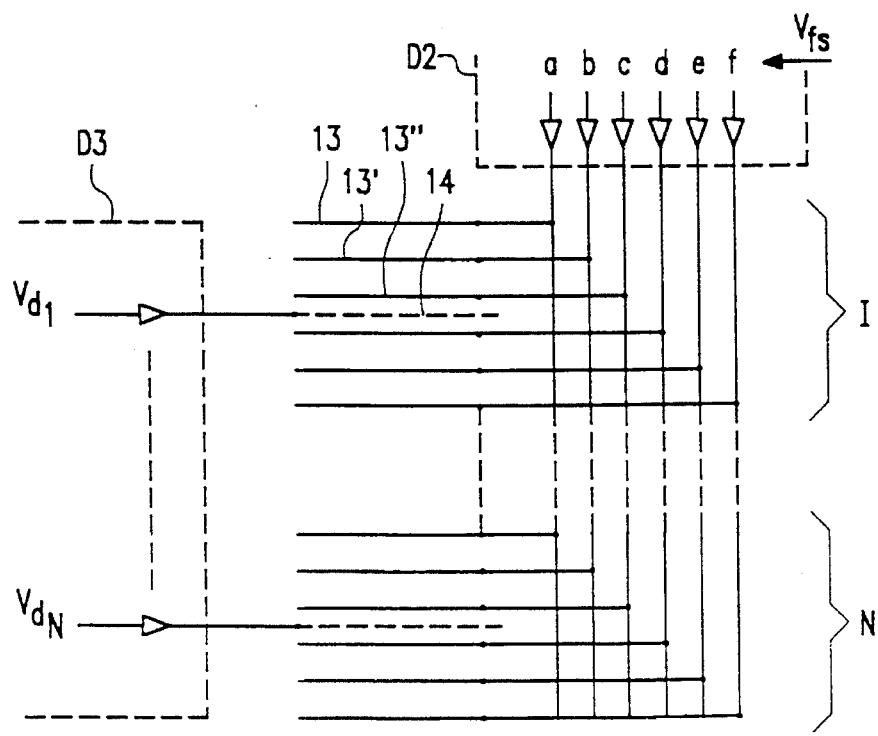
FIG. 12 shows an embodiment for reducing the number of drivers of the fine-selection electrodes provided with auxiliary electrodes.

In FIG. 12 in which, likewise as in FIG. 10, the fine-selection electrodes are interconnected per group of six electrodes, it is necessary to separately drive the dummy electrodes per group of six fine-selection electrodes with the aid of the dummy electrode drive circuit D3. The dummy electrodes 14, 14', 14", . . . are now driven by voltages Vd1 . . . , VdN, respectively, with each voltage Vdn having a value which is higher than the voltage at the selected fine-selection electrodes if the preselection electrode of a respective fine-selection block should not pass any electrons and having a value which is lower than the voltage at the selected fine-selection electrode but higher than the voltage at the non-selected fine-selection electrode if the preselection electrode of a respective fine-selection block should pass electrons. It is thereby achieved that unwanted electrons are collected by each dummy electrode, while the dummy electrode does not have any influence when a respective fine-selection block is "on". Thus, 6+N drivers are required in this embodiment.

Figure 13:
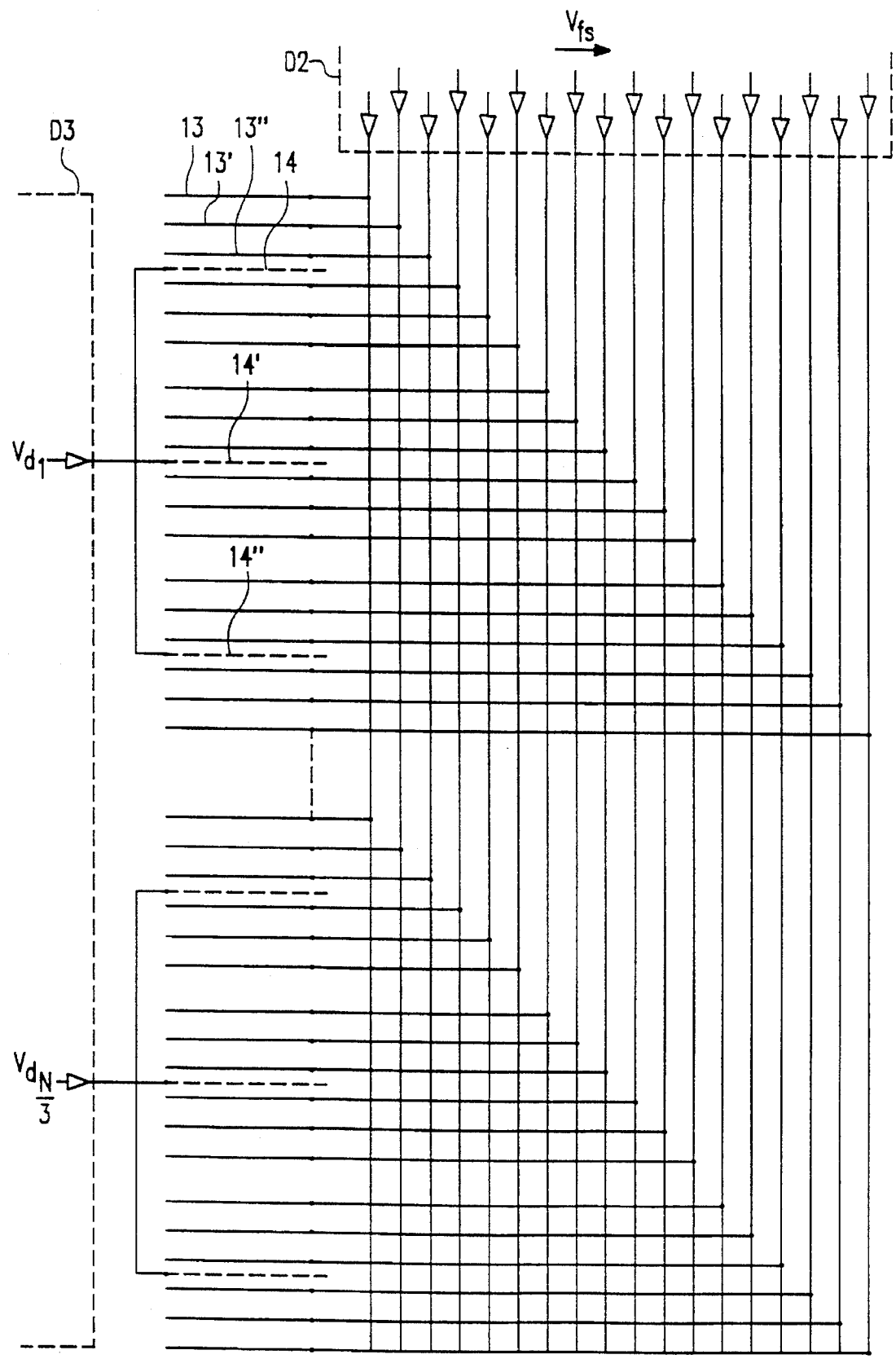
FIG. 13 shows a further embodiment for reducing the number of drivers of the fine-selection electrodes provided with the auxiliary electrodes, FIGS. 14A and B show embodiments of circuits for driving of an electron source arrangement.

FIG. 13 shows an embodiment in which the number of drivers is still further reduced. In this embodiment the dummy electrodes are interconnected per three groups of six fine-selection electrodes. There are now 18 drivers for the fine-selection electrodes, which drivers form part of the fine-selection drive circuit D2. By working with groups of 18 electrodes for the fine selection, the dummy electrodes per segment of 18 fine-selection electrodes can be jointly driven (three in this embodiment) with the aid of the fine-selection drive circuit D2. The number of drivers in this embodiment will be N/3+18 (generally the formula is: N/n+6*n, in which N is the number of preselection electrodes and n is the number of groups jointly forming a segment, while a choice of 6 fine-selection electrodes per preselection electrode has been made).

The auxiliary electrodes may further be interconnected, but then a concession is made with respect to the contrast.

An input of the clock generator 613 receives the separated synchronizing signals (a line synchronizing signal and a field synchronizing signal) from the synchronization processing circuit 63. The synchronization processing circuit may also be adapted to supply a signal indicating the standard of the incoming video signal, for example, PAL (50 Hz, 625 lines), NTSC (60 Hz, 525 lines) or HDTV (50 Hz, 1250 lines). The following signals are generated with reference to the synchronizing signals and TV standard signals, if any, in the clock generators 6 13 and 614:

a write clock generated by the clock generator 613 for writing the video information into the memory (MEM), a read clock generated by the clock generator 614 for reading the video information from the memory, a write signal generated by the clock generator 614 for sequentially writing each line/colour line in the video drive circuit (34), which write signal comprises clock signals as well as synchronizing signals, a read signal for parallel applying each line/colour line to the grid G1 of the line cathode 5, and a clock signal for controlling the selection driver 611.

Under the control of the clock generator 614 the selection driver 611 generates drive signals for controlling the drive circuit D1, which drive circuit applies the selection voltages to the (pre)selection electrodes (9, 9', 9", . . . ). In case of stepped selection, the selection driver 611 also generates drive signals for the fine-selection drive circuit D2 and for the dummy electrode drive circuit D3 (if any).

Since the selection driver 611 drives the preselection electrodes as well as the fine-selection electrodes and is controlled by the clock generator 614, likewise as the video drive circuit 34, the correct video information is displayed at the correct location on the display panel 3.

The write clock and the read clock need not have the same frequency. The write clock is related to the incoming video signal and the read clock is related to the rate of displaying the video signal on the display unit. The two clock generators 613 and 614 may be two clocks operating completely independently of each other (provided that the addressing in the video signal processing circuit is synchronized with the synchronization processing circuit during each field) but it will often be preferred to couple the two clocks at least together. The two clock signals are preferably generated in one clock generator which is controlled by the synchronization processing circuit 63.

Figure 14A:
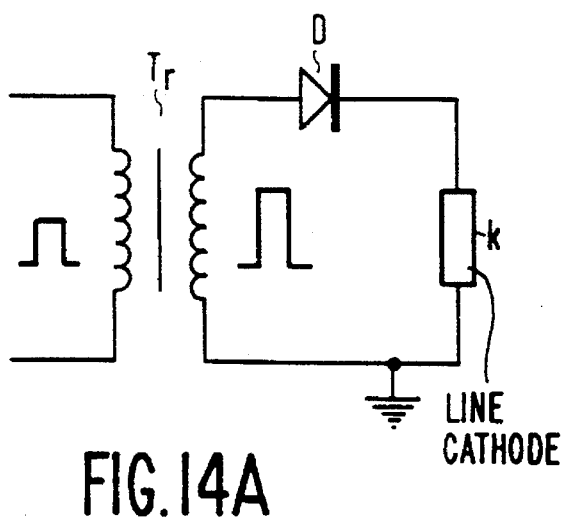
Figure 14B:
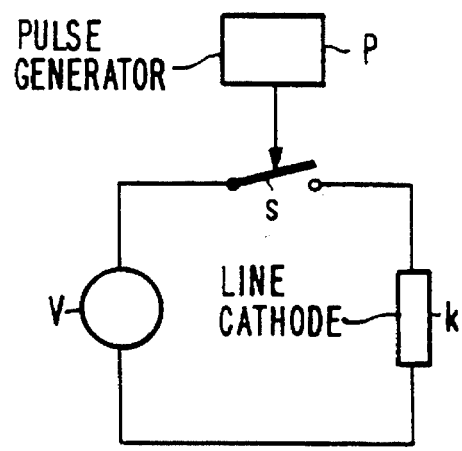

FIGS. 14A and 14B show examples of driving the line cathode k(5) and thereby keeping it at the desired temperature. Since the line cathode has a resistance, there will be a voltage drop across the line cathode if a voltage is presented to it. The resistance of the line cathode is necessary to heat the line cathode, but this will cause a difference in the number of electrons emitted by the line cathode in the different ducts. To prevent this, the choice may be made to present a voltage across the line cathode during the line retrace periods only. In FIG. 14A this is realised by applying the line retrace pulses which are used for generating the high voltage to the line cathode k via a transformer Tr and a diode D. The diode ensures that the voltage is present across the line cathode during the retrace pulse only. FIG. 14B shows an example in which the same effect is achieved by presenting a voltage to the line cathode during the line retrace periods only, starting from a DC source V which is connected to the line cathode via a switch S. The switch S is controlled by a pulse generator P (for example, coupled to the line retrace pulse). In an alternative solution the line cathode may be driven continuously and the voltage drop can be corrected by means of the G1 electrode drive.

The grid (G1 or G2) is preferably driven by means of pulse width modulation. The advantage of pulse width modulation as compared with pulse amplitude modulation is that pulse width modulation provides an accurate proportion between the period when the grid G1 (G2) passes electrons and the number of electrons which is passed. The value of the voltage at the G1 electrodes is of the order of 5 to 30 volts. In case of pulse amplitude modulation of the voltage at the grid G1 (G2) there is not such an accurate proportion, and extra measures will have to be taken to ensure that the relation between the presented video information and the number of emitted electrons (and hence the displayed video information) remains accurately fixed.

Since the display unit 1 of the above-described display device W is of the flat-panel type, it is quite feasible that the display unit section is attached, for example, "to the wall" and that the "rest" of the display device (tuner section) is arranged in a box, for example, "on the floor". All kinds of connections may then be chosen for controlling the display unit of the display unit section with the aid of the tuner section. For example, a multiple bus connection can be chosen or the control can be realised via, for example, infrared connections or via a given frequency (band) or, for example, via a glass fibre connection. The most obvious separation between display section and tuner section is that the display unit 1, the selection driver 611, the drive circuit(s) D1, (D2 and D3) and the video drive circuit 34 form part of the display unit section (see FIG. 6). The tuner section then comprises the synchronization processing circuit 63, the clock generators 613 and 614 and the video signal processing circuit 65.

We claim:

1. A picture display device comprising a display unit having a vacuum envelope which is provided with a transparent face plate with a luminescent screen and a rear plate, said display unit comprising a plurality of juxtaposed sources for emitting electrons, a plurality of electron transport ducts cooperating with the sources and extending substantially parallel to the face plate for transporting the electrons in the form of electron currents, and an active selection structure for withdrawing each electron current at predetermined locations from its transport duct and for directing said current towards desired pixels of the luminescent screen, said picture display device comprising a video signal processing circuit for receiving an incoming video signal having a given line number, for processing the video signal to a video signal which is suitable for the luminescent screen and for applying the processed video signal to a video drive circuit coupled to the sources, and in that the video drive circuit is adapted to sequentially write the video signal received from the video signal processing circuit and to apply, in parallel, video information of a line to be displayed to drive electrodes of the juxtaposed sources, in that the picture display device comprises clock generator means for generating a write and a read clock signal and for applying the clock signals to the video signal processing circuit in that the picture display device comprises a selection driver which is adapted to generate selection voltages under the control of the clock generator means for withdrawing electron currents from a plurality of transport ducts at locations determined with reference to the selection voltages.

2. A picture display device as claimed in claim 1, characterized in that the video signal processing circuit comprises a memory and a control section, the processed video signal being written, processed and read from the memory under the control of said section, and in that the clock generator means is coupled to a synchronization processing circuit which receives synchronizing signals and, after processing, controls the clock generator means by means of a signal dependent on the received synchronizing signals, and which synchronization processing circuit generates a television standard-dependent signal with reference to the received synchronizing signals and applies said signal to the clock generator and to the control section.

3. A picture display device as claimed in claim 1, characterized in that the selection driver is coupled to a drive circuit, which drive circuit is coupled to the active selection structure, which active selection structure is provided with extraction locations which can be activated and communicate row by row with the transport ducts and the active selection structure comprises row-sequential selection electrodes, which selection electrodes are coupled to the drive circuit, said drive circuit applying voltages to the selection electrodes in such a way that respective rows are selected.

4. A picture display device as claimed in claim 1, characterized in that the active selection structure comprises a preselection structure having extraction locations which can be activated and communicate row by row with the transport ducts and a selection plate having apertures which can be activated and are each associated with a pixel, each activatable extraction location of the preselection plate being associated with at least two activatable apertures of the selection plate.

5. A picture display device as claimed in claim 4, characterized in that an auxiliary electrode for collecting unwanted electrons is arranged between each extraction location and associated selection apertures, and in that the auxiliary electrodes are coupled to a third drive circuit which, in operation, provides the auxiliary electrodes with such a voltage under the control of the selection driver that unwanted electrons are collected.

6. A picture display device comprising a display unit having a vacuum envelope which is provided with a transparent face plate with a luminescent screen and a rear plate, said display unit comprising a plurality of juxtaposed sources for emitting electrons, a plurality of electron transport ducts cooperating with the sources and extending substantially parallel to the face plate for transporting the electrons in the form of electron currents, and an active selection structure for withdrawing each electron current at predetermined locations from its transport duct and for directing said current towards desired pixels of the luminescent screen, said picture display device comprising a video signal processing circuit for receiving an incoming video signal having a given line number, for processing the video signal to a video signal which is suitable for the luminescent screen and for applying the processed video signal to a video drive circuit coupled to the sources and in that the sources for emitting electrons comprise a line cathode which is coupled to a voltage source and in that the voltage source is a pulsatory voltage source for driving the line cathode during line retrace periods.

7. A picture display device as claimed in claim 6, characterized in that the sources are provided with one drive electrode per transport duct for modulating, under the control of the video drive circuit, the number of electrons to be emitted in the transport ducts.

8. A picture display device comprising a display unit having a vacuum envelope which is provided with a transparent face plate with a luminescent screen and a rear plate, said display unit comprising a plurality of juxtaposed sources for emitting electrons, a plurality of electron transport ducts cooperating with the sources and extending substantially parallel to the face plate for transporting the electrons in the form of electron currents, and an active selection structure for withdrawing each electron current at predetermined locations from its transport duct and for directing said current towards desired pixels of the luminescent screen, said picture display device comprising a video signal processing circuit for receiving an incoming video signal having a given line number, for processing the video signal to a video signal which is suitable for the luminescent screen and for applying the processed video signal to a video drive circuit coupled to the sources, and in that the picture display device comprises a uniformity control which is provided with detector means for measuring magnitudes of currents transported through the transport ducts in response to a test signal applied to the video drive circuit during the field retrace time.

9. A picture display device as claimed in claim 8, characterized in that the uniformity control comprises a comparison circuit for comparing the current magnitudes measured by the detectors and for supplying a difference signal.

10. A picture display device comprising a display unit having a vacuum envelope which is provided with a transparent face plate with a luminescent screen and a rear plate, said display unit comprising a plurality of juxtaposed sources for emitting electrons, a plurality of electron transport ducts cooperating with the sources and extending substantially parallel to the face plate for transporting the electrons in the form of electron currents, and an active selection structure for withdrawing each electron current at predetermined locations from its transport duct and for directing said current towards desired pixels of the luminescent screen, said picture display device comprising a video signal processing circuit for receiving an incoming video signal having a given line number, for processing the video signal to a video signal which is suitable for the luminescent screen and for applying the processed video signal to a video drive circuit coupled to the sources and in that the video drive circuit has as many outputs as the display device has electron transport ducts, and in that each output is coupled to a drive electrode which modulates the number of electrons to be emitted by the sources in the respective transport ducts.

11. A picture display device comprising a display unit having:

a plurality of juxtaposed sources for emitting electrons;

a plurality of electron transport ducts cooperating with the sources for transporting the electrons in the form of electron currents;

an active selection structure for extracting each electron current at predetermined locations from its transport duct; and means for directing said extracted current towards desired pixels of a luminescent screen; said picture display device further comprising:

a video signal processing circuit for receiving an incoming video signal representing a raster having a certain number of lines, and for processing the incoming video signal to obtain a processed video signal;

a video drive circuit adapted to receive the processed video signal in a sequential manner and to apply, in parallel, video information of a line to be displayed to drive electrodes of the juxtaposed sources;

clock generator means for generating clock signals and for applying the clock signals to the video processing circuit; and a selection driver which is adapted to generate selection voltages under control of the clock generator means for withdrawing the electron currents from the plurality of electron transport ducts at locations determined with reference to the selection voltages.

12. A picture display device comprising a display unit having:

a plurality of juxtaposed sources for emitting electrons, said sources comprising at least one line cathode;

a plurality of electron transport ducts cooperating with the sources for transporting the electrons in the form of electron currents;

an active selection structure for extracting each electron current at predetermined locations from its transport duct; and means for directing said extracted current towards desired pixels of a luminescent screen; said picture display device further comprising:

a video signal processing circuit for receiving an incoming video signal representing a raster having a certain number of lines, and for processing the incoming video signal to obtain a processed video signal;

a video drive circuit adapted to receive the processed video signal and coupled to the juxtaposed sources; and a voltage source coupled to the at least one line cathode for applying a pulsatory voltage for driving the at least one line cathode during line retrace periods.

13. A picture display device comprising display unit having:

a plurality of juxtaposed sources for emitting electrons;

a plurality of electron transport ducts cooperating with the sources for transporting the electrons in the form of electron currents;

an active selection structure for extracting each electron current at predetermined locations from its transport duct; and means for directing said extracted current towards desired pixels of a luminescent screen;

said picture display device further comprising:

a video signal processing circuit for receiving an incoming video signal representing a raster having a certain number of lines, and for processing the incoming video signal to obtain a processed video signal;

a video drive circuit adapted to receive the processed video signal and which is coupled to the juxtaposed sources; and a uniformity circuit which is provided with detector means for measuring the electron currents transported through the transport ducts in response to a test signal applied to the video drive circuit during the field retrace time.

14. A picture display device comprising a display unit having:

a plurality of juxtaposed sources for emitting electrons;

a plurality of electron transport ducts cooperating with the sources for transporting the electrons in the form of electron currents;

an active selection structure for extracting each electron current at predetermined locations from its transport duct; and means for directing said extracted current towards desired pixels of a luminescent screen;

said picture display device further comprising:

a video signal processing circuit for receiving an incoming video signal representing a raster having a certain number of lines, and for processing the incoming video signal to obtain a processed video signal; and a video drive circuit adapted to receive the processed video signal and coupled to the juxtaposed sources, the video drive circuit having as many outputs as the display device has electron transport ducts, and each video drive circuit output being coupled to a drive electrode for modulating the electron current to be emitted by the sources in the respective transport ducts.

15. A method of displaying a video signal by means of a display unit having:

a plurality of juxtaposed sources for emitting electrons;

a plurality of electron transport ducts cooperating with the sources for transporting the electrons in the form of electron currents; and an active selection structure for extracting each electron current at predetermined locations from its transport duct and for directing said extracted current towards desired pixels of a luminescent screen;

said method comprising the steps of:

receiving an incoming video signal in a sequential manner, said incoming video signal having a certain number of lines;

processing the incoming video signal to obtain a processed video signal to be applied in parallel to the sources;

generating selection voltages for withdrawing the electron currents from the plurality of electron transport ducts at locations determined with reference to the selection voltages; and generating clock signals to control the processing of the incoming video signal and the generation of the selection voltages.

16. A method of displaying a video signal by means of a display unit having:

a plurality of juxtaposed sources for emitting electrons, said sources comprising at least one line cathode coupled to receive a pulsatory voltage for driving the line cathode during line retrace periods;

a plurality of electron transport ducts cooperating with the sources for transporting the electrons in the form of electron currents; and an active selection structure for extracting each electron current at predetermined locations from its transport duct and for directing said extracted current towards desired pixels of a luminescent screen;

said method comprising the steps of:

receiving an incoming video signal having a certain number of lines; and processing the incoming video signal to obtain a processed video signal to be applied in parallel to the sources.

17. A method of displaying a video signal by means of a display unit having:

a plurality of juxtaposed sources for emitting electrons;

a plurality of electron transport ducts cooperating with the sources for transporting the electrons in the form of electron currents; and an active selection structure for extracting each electron current at predetermined locations from its transport duct and for directing said extracted current towards desired pixels of a luminescent screen;

said method comprising the steps of:

receiving an incoming video signal having a certain number of lines;

processing the incoming video signal to obtain a processed video signal to be applied to the sources; and measuring the electron current transported through at least one of the transport ducts in response to a test signal applied to the sources during the field retrace time.

* * * * *